United States Patent [19]

Yabe et al.

[11] Patent Number: 4,828,944
[45] Date of Patent: May 9, 1989

[54] THIN BATTERY-CONTAINING STRUCTURE

[75] Inventors: Noboru Yabe; Yoshimata Yasui, both of Tokyo, Japan

[73] Assignee: Casio Computer Co., Ltd., Tokyo, Japan

[21] Appl. No.: 118,258

[22] Filed: Nov. 9, 1987

[30] Foreign Application Priority Data

Nov. 14, 1986 [JP] Japan .......................... 61-174116[U]

[51] Int. Cl.$^4$ ........................ H01M 2/10; B65D 43/20
[52] U.S. Cl. ...................................... 429/97; 429/100; 220/326; 220/346; 220/348
[58] Field of Search ................ 220/324, 326, 346, 348; 429/9, 97, 100

[56] References Cited

U.S. PATENT DOCUMENTS

| | | | |
|---|---|---|---|
| 2,313,428 | 3/1943 | Glenn | 220/348 X |
| 3,175,853 | 3/1965 | Gilbertson | 220/326 X |
| 3,897,268 | 7/1975 | Haraguchi | 429/97 |
| 4,213,078 | 7/1980 | Ferrell et al. | 429/100 X |
| 4,641,747 | 2/1987 | Mestdagh et al. | 220/346 X |

FOREIGN PATENT DOCUMENTS 58-11014  3/1983  Japan .

Primary Examiner—Stephen J. Kalafut
Attorney, Agent, or Firm—Frishauf, Holtz, Goodman & Woodward

[57] ABSTRACT

The present invention relates to a thin battery-containing structure for an electronic apparatus which includes a lock pin provided on a flexible arm of a battery holder. The lock pin is guided to a predetermined position by a guide/lock groove in a case by pressing a battery holder inward for installing a battery in the battery container of the case. The lock pin is disengaged by the guide/lock groove when further inward force is applied. Upon removal of such force, the battery holder is pressed out of the battery container.

14 Claims, 4 Drawing Sheets

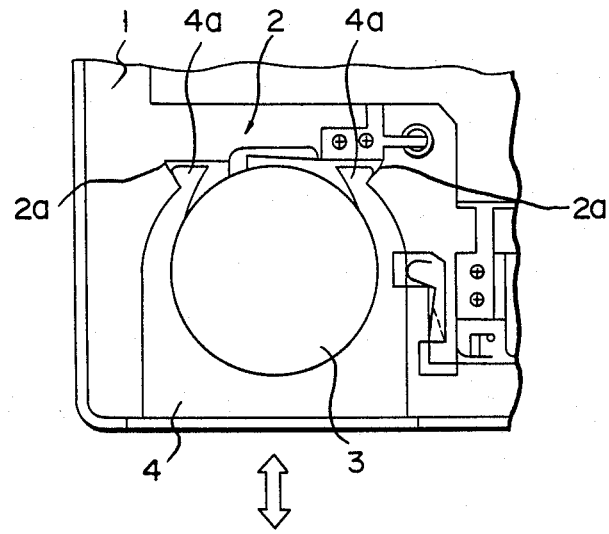
F I G. 1
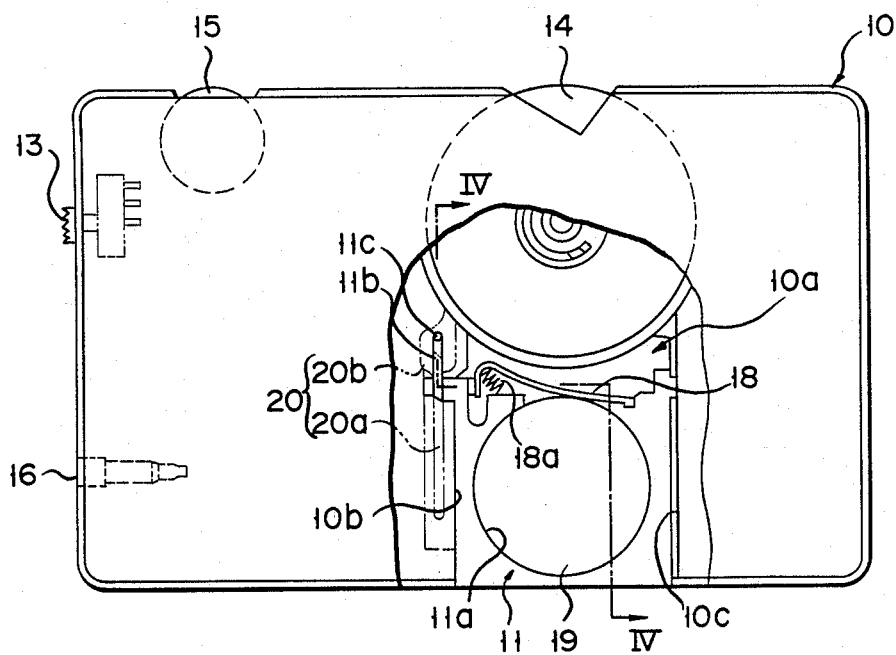
F I G. 2

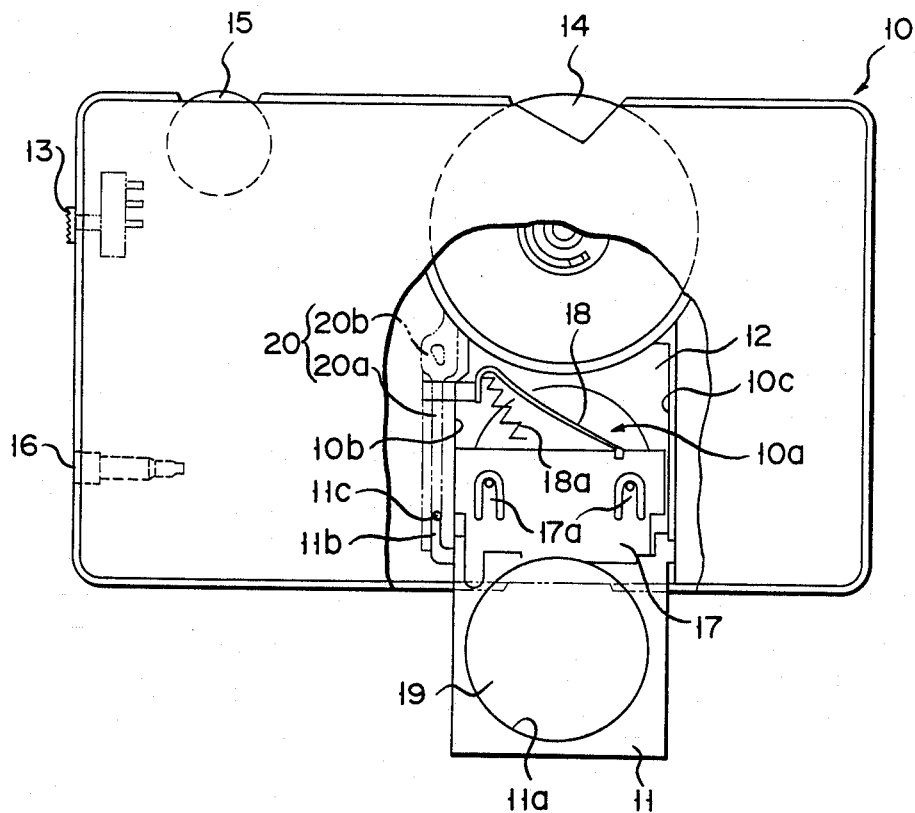
F I G. 3

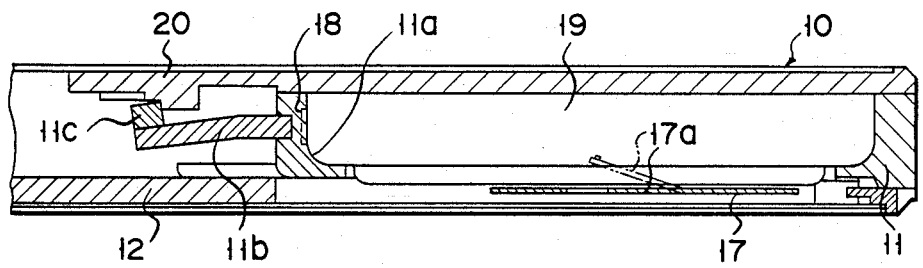
F I G. 4
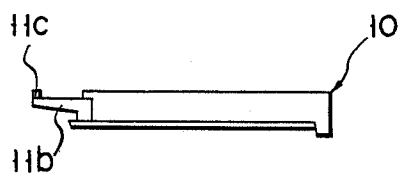
F I G. 5
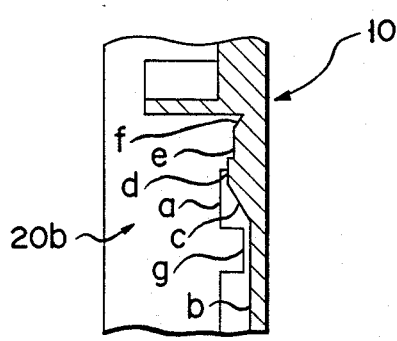
F I G. 7

THIN BATTERY-CONTAINING STRUCTURE

BACKGROUND OF THE INVENTION

Heretofore, small-sized electronic apparatuses, such as pocket radio receivers, have made use of a thin battery, such as a button type battery. FIG. 1 shows a structure for such a button-type battery. When battery holder 4, for holding button-type battery 3, is inserted in battery container 2 of case 1, pawls 4a, 4b formed at the end of battery holder 4 are engaged with engaging claws 2a, 2b in battery container 2. In this way, battery holder 4 is engaged with battery container 2. When battery holder 4 is removed, pawls 4a, 4b are formed with slopes of approx. 45° with respect to the attaching or detaching direction of battery holder 4, and battery holder 4 is pulled beforehand to disengage pawls 4a, 4b from engaging claws 2a, 2b, thereby removing battery holder 4 due to the deflections of pawls 4a, 4b to the side of battery 3.

However, when the elasticity of pawls 4a, 4b is excessively strong with respect to the removing force of battery holder 4 in this structure, battery holder 4 can be removed only with difficulty, while when they are excessively weak, its impact resistance decreases so that battery holder 4 might be detached. Thus, the structure of this type has disadvantages because the elasticity of pawls 4a, 4b cannot readily be regulated.

SUMMARY OF THE INVENTION

Accordingly, an object of the present invention is to provide a thin battery-containing structure in which a battery holder is not unintentionally removed and a battery can be readily replaced by a simple operation.

According to the present invention, there is provided a thin battery-containing structure for an electronic apparatus comprising a case, a battery holder detachably contained in a battery container in the case, terminal plates provided in the battery container in contact with electrodes of thin battery contained in the battery holder, a lock pin provided at the battery holder and having a flexible arm, a guide lock provided at the battery holder for guiding to engage the lock pin at a predetermined position when pressing to set the battery holder in the battery container and disengaging the engagement of the lock pin when further pressing the battery holder in the battery container to set the holder to the detachable state, and a spring member for pressing out the battery holder contained in the battery container.

In the battery-containing structure of this invention, when the battery holder is pressed to be set in the battery container of the case, the lock pin provided through the arm having a flexibility in the battery holder is guided to be engaged by the guide lock in the case. When the battery holder is further pressed, the lock pin is disengaged by the guide lock to press out the battery holder by the spring member in the case from the battery container. Therefore, the battery-containing structure of this invention has the advantages in that the battery holder can not be removed unintentionally and the battery itself can be readily replaced by means of a simple operation.

BRIEF DESCRIPTION OF THE DRAWINGS

FIG. 1 is a view showing a battery holder of a conventional thin electronic apparatus;

FIG. 2 is a view showing a thin electronic apparatus in which a battery is contained according to the present invention;

FIG. 3 is a view showing a thin electronic apparatus in which a battery holder is removed according to the present invention;

FIG. 4 is a sectional view taken along the line IV—IV in FIG. 2;

FIG. 5 is a side view of a battery holder of a thin electronic apparatus according to the present invention;

FIG. 7 is a sectional view taken along the line VII—VII in FIG. 6; and

DETAILED DESCRIPTION OF THE PREFERRED EMBODIMENTS

Figure 6:
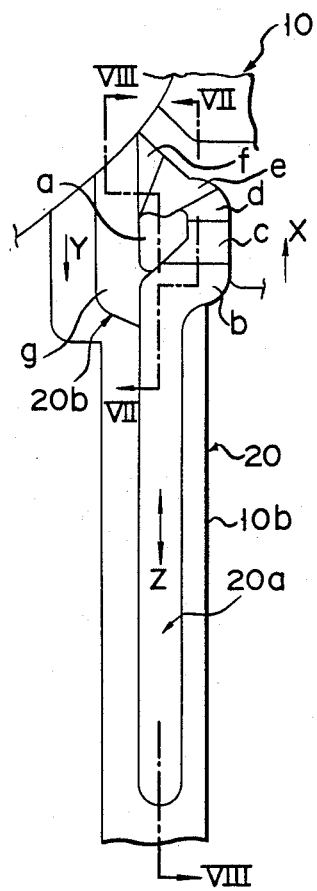
FIG. 6 is a bottom view of a guide lock groove of a thin electronic apparatus according to the present invention.

Preferred embodiments of the present invention applied to a thin radio receiver will now be described in detail with reference to FIGS. 2 to 8.

FIGS. 2 to 4 show a thin radio receiver. A thin battery containing structure of the present invention comprises case 10. Case 10 is formed in a thin flat plate shape opened at the lower side. Case 10 detachably contains battery holder 11 therein. Circuit substrate 12 is attached by screws to the bottom of container 10. Front and back sheets are respectively bonded to the upper and lower surfaces of case 10. On circuit substrate 12 are placed components necessary for radio receiving function, such as power switch 13, tuning switch 14, variable resistor switch 15, earphone socket 16, an antenna, not shown, and an LSI, etc.

Battery container 10a for containing battery 11 is provided in case 10. Battery container 10a has, as shown in FIGS. 3 and 4, guide walls 10b and 10c for guiding both sides of battery holder 11, and terminal plates 17 and 18 provided on the bottom (lower portion) thereof. Circuit substrate 12 is cut out at a portion corresponding to battery container 10a, and terminal plate 17 is disposed over the cut-out portion. Terminal plate 17 is contacted with the lower surface (negative electrode) of battery 19, and made of a metal plate, such as a stainless steel plate. Cut and erected contactors 17a are formed at predetermined positions on terminal plate 17. Terminal plate 18 is formed of a leaf spring contacted with the side (positive electrode) of battery 19 and shaped by bending a slender metal plate in "L" shape. Terminal plate 18 is disposed in the depth side of battery container 10a, is soldered at one end thereof to circuit substrate 12, and is elastically contacted at the other end thereof with the side of battery 19. When battery holder 11 is installed in battery container 10a (as shown in FIG. 2). Terminal plate 18 presses, or biases, battery holder 11 in an outward direction relative to battery container 10a (as shown in FIG. 3). Auxiliary coiled spring 18a is formed at the bent portion of terminal plate 18. This auxiliary coiled spring 18a contained in battery holder 11 is compressed as battery holder 11 is installed to press battery holder 11 outwardly of battery container 10a.

Battery holder 11 for containing battery 19 is formed in a square flat plate shape, and has at its center a battery containing hole 11a for containing button-type battery 19. Battery holder 11 includes at its one end a projecting arm 11b extending from a side adjacent wall 10b toward the above-mentioned depth side. Lock pin 11c is erected at the end of projecting arm 11b. Arm 11b is to be flexible upward or downward (see FIG. 4), or rightward or leftward directions (see FIGS. (2, 3)). Lock pin 11c moves along guide lock groove 20 to be described later, and serves to lock battery holder 11 at a predetermined position when battery holder 11 is set in battery container 10a. Lock pin 11c is engaged with guide lock groove 20 so that battery holder 11 can not be removed entirely from battery container 10a even the lock pin is released from the predetermined position so that the battery holder 11 can be partially withdrawn from battery container 10a. Battery containing hole 11a penetrates battery holder 11 elevationally as shown in FIG. 4 so that the lower portion (negative electrode portion) of battery projects therefrom. Thus, contactors 17a, 17a of electrode plate 17 are elastically contacted with the projected portion of battery 19. The depth side of battery containing hole 11a is open as shown in FIG. 2. The side (positive electrode portion) of battery 19 is projected from the opened portion, and leaf spring-like terminal plate 18 is elastically contacted with the projected portion of battery 19.

Figure 8:
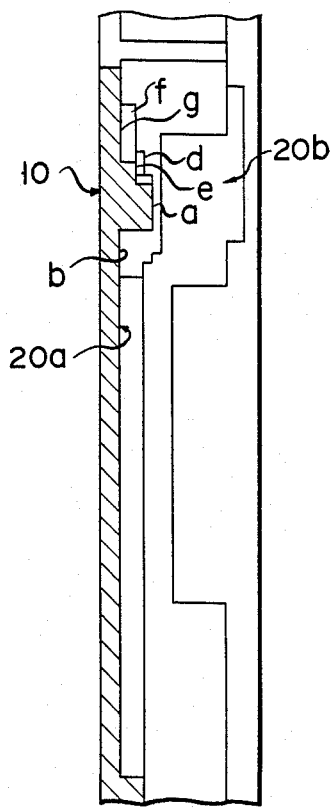
FIG. 8 is a sectional view taken along the line VIII—VIII in FIG. 6.

Guide lock groove 20 in which lock pin 11c of battery holder 11 is engaged is provided on the inner surface of case 10, and formed, as shown in FIGS. 6 to 8, of a linear portion 20a, and an annular portion 20b. More specifically, as shown in FIG. 6, linear portion 20a serves to move lock pin 11c in a direction of an arrow Z when installing and removing battery holder 11. Lock pin 11c contacts the forward end (lower end) of the groove when battery holder 11 is pulled out to the maximum permitted extent. Thus, battery holder 11 cannot be completely removed from battery container 10a because lock pin 11c cannot be extracted from groove 20a with only a sliding motion. Annular portion 20b serves to guide lock pin 11c in a direction of arrow X as lock pin 11c travels from linear portion 20a when battery holder 11 is set to the predetermined position. Also, lock pin 11c travels in the direction of arrow Y when removal of battery 19 is necessary so that lock pin 11c is returned to linear portion 20a. Annular portion 20b is formed at the center into a raised portion (a) of "heart" shape and the groove on the periphery of (a) is partitioned into partitions (b) to (g). In a range of partitions (b) to (e) of annular portion 20b, lock pin 11c moves in a direction of an arrow X when battery holder 11 is inserted into battery container 10a, and in a range of partitions (e) to (g) of annular portion 20b, lock pin 11c moves in a direction of an arrow Y. More specifically, partition (b) combines with linear portion 20a to be deepest in the groove. Partition (c) is inclined to increase the pressing force of battery holder 11 so that the groove is gradually made more shallow. Partition (d) is flat to provide a click feeling when battery holder 11c is set, and its arcuate outer wall guides lock pin 11c into slightly deeper portion (e). Partition (e) sets battery holder 11 to a predetermined position by engaging lock pin 11c with circular-arc-shaped recess of the outer periphery of raised portion (e) to be deeper in the groove than partition (d) and raised portion (a), and shallower than partition (b). In this position terminal electrode 18 presses lock pin 11c in direction Y into engagement with raised portion (a) at its indented point to place battery holder 11 at its installed, predetermined position. Partition (f) places lock pin 11 c into portion (9) when battery holder 11 is furtherpressed inward from its installed position as shown in FIG. 7, portion (f) starts downward (i.e. deeper) from portion (e). When battery holder 11 is pressed inward, lock pin 11c moves in direction X, abuts against the angled outer wall of portion (f), and is guided into portion (g). When inward force on battery holder 11 is released, terminal plate 18 and auxiliary coiled spring 18a move battery holder 11 in direction Y. Due to the just-described arrangement lock pin 11c always moves sequentially in partitions (b) to (g), but does not move in the direction.

The operation of battery holder 11 when replacing battery of the thin radio receiver constructed as described above will be described.

As shown in FIG. 3, battery holder 11 is first removed from battery container 10a of case 10. Then, since battery containing hole 11a formed at battery holder 11 is exposed out of case 10, button-shaped battery 19 can be inserted to be set in battery containing hole 11a thus exposed. When battery holder 11 for containing battery 19 is pressed into battery container 10a, lock pin 11c provided through arm 11b at battery holder 11 moves from the forward wall along linear portion 20a of guide lock groove 20 formed on the inner surface of case 10. Then, contactors 17a, 17a of terminal plate 17 formed on the bottom of battery container 10a are elastically contacted with the lower surface (negative electrode) of battery 17, and terminal plate 18 and auxiliary coiled spring 18a are elastically contacted with the depth wall of battery holder 11. In this state, battery holder 11 is not completely contained in battery container 10a, but is projected externally in some degree. When battery holder 11 is further pressed against elastic forces of terminal plate 18 and auxiliary coiled spring 18a, lock pin 11c of battery holder 11 moves from linear portion 20a of guide lock groove 20 into annular portion 20b to move within annular portion 20b in a direction of arrow X. More specifically, lock pin 11c is moved upward on the slope of partition (c) from partition (b) of annular portion 20b to ride over partition (d) and than to eventually fall in click feeling into partition (e). When the manual insertion force is removed from battery holder 11 in this state, battery holder 11 is pressed elastically by terminal plate 18 and auxiliary coiled spring 18a in direction 4. Thus, lock pin 11c settles into the recess of the outer periphery of raised portion (a) in partition (e) to be securely engaged. Thus, battery holder 11 is completely and securely installed in battery container 10a as shown in FIG. 1 so as not to be unintentionally removed. When battery holder 11 is thus set, contactors 17a, 17a of terminal plate 17 are elastically contacted directly with the lower surface (negative electrode) of battery 19, and terminal plate 18 is elastically contacted with the side (positive electrode) of battery 19 projected from the depth wall of battery holder 11. Therefore, battery 19 is electrically connected to circuit substrate 12. When battery 19 is thus contained, contactors 17a, 17a of terminal plate 17 formed on the bottom of battery container 10 are elastically contacted directly with the lower surface of battery 19 to lift battery 19. Thus, even if case 10 is slightly bumped, battery 19 contained in battery container 10a does not vibrate or move out of position, but is securely and reliably contained in battery container 10a.

When battery 19 thus contained is removed, battery holder 11 is again pressed inward. In other words, when battery holder 11 is further pressed against the elastic forces of electrode plate 18 and auxiliary coiled spring 18a, lock pin 11c is contacted with the outer wall of partition (e) to forcibly ride over partition (f) along the outer wall to be fed to next partition (g). When the manually applied force is released from battery holder 11 in this state, battery holder 11 is pressed out to some degree by electrode plate 18 and auxiliary coiled spring 18a. Then, lock pin 11c is again fed from partition (g) of annular portion 20b to linear portion 20a. When the outwardly extending portion of battery holder 11 is pulled by hand, battery holder 11 is pulled out from battery container 10a as shown in FIG. 3, and battery 19 contained in battery holder 11 can then be replaced. When battery holder 11 is pulled out in this manner, lock pin 11c engages the forward wall of linear portion 20a of guide lock groove 20. Thus, battery holder 11 cannot be completely removed from battery container 10a. Therefore, battery holder 11 does not become lost.

According to the battery containing structure thus constructed, battery 19 can be readily replaced by a simple operation of merely pressing battery holder 11 inward, and battery holder 11 cannot be unintentionally removed from its installed position.

In the embodiment described above, auxiliary coiled spring 18a has been provided at the bent portion of leaf spring-like terminal plate 18. However, when terminal plate 18 has sufficient elastic force (flexible force), auxiliary coiled spring 18a may not always be provided.

In the embodiment described above, the case that the battery containing structure is applied to a thin radio receiver has been described. However, the present invention is not limited to the particular embodiment. For example, the present invention may be applied widely to other pocket television, or other small-sized electronic apparatuses.

What is claimed is:

1. A thin battery-containing structure for an electronic apparatus, comprising:
    a battery holder;
    a case having a battery-storing section including means for receiving said battery holder along an insertion direction;
    a first terminal plate located in said battery-storing section, said first terminal plate being in contact with one electrode of a thin battery having two electrodes when said battery holder with the thin battery received therein is housed in said battery-storing section inside of said case, said first terminal plate including at least one electrical contactor means for securing the thin battery therein;
    a second terminal plate located in said battery-storing section, said second terminal plate being in contact with the other electrode of the thin battery at least when said battery holder with the thin battery received therein is at a housed position in said battery-storing section inside of said case, said second terminal plate being placed perpendicularly to said first terminal plate and having resilient means for, when the battery holder is at its housed position, biasing the battery holder in a direction opposite to said insertion direction and, when the battery holder is released from said housed position, actuating motion of the battery holder in said opposite direction,
    a lock pin integral with said battery holder and supported by a flexible arm; and
    a guide/lock portion, located in said case, including means for guiding said lock pin, when said battery holder is pushed into said battery-storing section until said battery holder is engaged at a predetermined point to set said housed position, and means for releasing the engagement of said lock pin when said battery holder is pushed inward from the predetermined point to thereby enable movement of said battery holder by said resilient means in the opposite direction to withdraw said battery holder from said battery-storing section.

2. A thin battery-containing structure for an electronic apparatus according to claim 1, wherein said electronic apparatus comprises a receiver.

3. A thin battery-containing structure for an electronic apparatus according to claim 2, wherein said receiver comprises a radio receiver.

4. A thin battery-containing structure according to claim 1, wherein said first terminal plate includes two contactors.

5. A thin battery-containing structure according to claim 1, wherein said battery-storing section includes an auxiliary spring member having one end fixed inside said battery-storing section, said auxiliary spring member being compressed by said battery holder engaged at said predetermined point.

6. A thin battery-containing structure according to claim 1, wherein said guide/lock portion includes a straight section in which said lock pin moves linearly when said battery holder is pushed in or pulled out of the battery-storing section, and an annular section along which said lock pin moves.

7. A thin battery-containing structure according to claim 6, wherein said annular section of said guide/lock portion includes a plurality of divisions, at least adjacent ones of said divisions having different -depth grooves.

8. A thin battery-containing structure for an electronic apparatus, comprising:
    a battery holder;
    a case having a battery-storing section including means for receiving said battery holder along an insertion direction;
    at least two terminal plates located in said battery-storing section, said terminal plates being in contact with electrodes of a thin battery having two electrodes, respectively, when said battery holder with the thin battery received therein is housed in said battery-storing section inside of said case;
    a lock pin integral with said battery holder and supported by a flexible arm; and
    a guide/lock portion located in said case and including: an elongated straight section in which said lock pin moves linearly when said battery holder is pushed in or pulled out; means for retaining the lock pin within said guide/lock portion while said battery holder is pulled out of said case to an extent sufficient to insert a battery into or remove said battery therefrom; and an annular section along which said lock pin moves, said annular section including means for guiding said lock pin until said battery holder is engaged at a predetermined point when said battery holder is pushed into said battery-storing section for setting, and means for releasing the engagement of said lock pin when said battery holder is pushed inward from the predetermined point to thereby make the battery holder ready for withdrawal from said battery-storing section.

9. A thin battery-containing structure according to claim 8, wherein said terminal plates include: a first terminal plate having at least one contactor used for securing the thin battery; and a second terminal plate having resilient means for biasing the battery holder in a direction opposite to said insertion direction.

10. A thin battery-containing structure according to claim 9, wherein said first terminal plate has two contactors.

11. A thin battery-containing structure according to claim 8, wherein said battery-storing section includes an auxiliary spring member having one end fixed inside said battery-storing section, said auxiliary spring member being compressed by said battery holder engaged at said predetermined point.

12. A thin battery-containing structure according to claim 8, wherein said annular section of said guide/lock portion is constituted by a plurality of divisions, at least adjacent ones of said divisions having different-depth grooves.

13. A thin battery-containing structure for an electronic apparatus according to claim 8, wherein said electronic apparatus comprises a receiver.

14. A thin battery-containing structure for an electronic apparatus according to claim 13, wherein said receiver comprises a radio receiver.

* * * * *